US012400591B2

(12) United States Patent
Fan et al.

(10) Patent No.: US 12,400,591 B2
(45) Date of Patent: Aug. 26, 2025

(54) DISPLAY PANEL AND PIXEL CIRCUIT WITH DETECTION AND COMPENSATION OF ANODE VOLTAGE USING THE SAME OUTPUT PIN FOR MULTIPLE PIXELS

(71) Applicant: KunShan Go-Visionox Opto-Electronics Co., Ltd, Jiangsu (CN)

(72) Inventors: Longfei Fan, Kunshan (CN); Longyan Wang, Kunshan (CN); Hui Zhu, Kunshan (CN); Zhenzhen Han, Kunshan (CN); Siming Hu, Kunshan (CN); Jianlong Wu, Kunshan (CN); Lu Zhang, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 836 days.

(21) Appl. No.: 17/000,586

(22) Filed: Aug. 24, 2020

(65) Prior Publication Data

US 2020/0388216 A1 Dec. 10, 2020

Related U.S. Application Data

(63) Continuation of application No. PCT/CN2019/103378, filed on Aug. 29, 2019.

(30) Foreign Application Priority Data

Dec. 14, 2018 (CN) ........................ 201811537143.0

(51) Int. Cl.
*G09G 3/32* (2016.01)
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2310/08* (2013.01)

(58) Field of Classification Search
CPC . G09G 3/3233; G09G 3/3266; G09G 2310/08
See application file for complete search history.

(56) References Cited

U.S. PATENT DOCUMENTS

2014/0092076 A1* 4/2014 Lee ..................... G09G 3/3291 345/212
2017/0193896 A1 7/2017 Kim
2019/0058029 A1* 2/2019 Woo ..................... G09G 3/3258

FOREIGN PATENT DOCUMENTS

CN 101689349 A 3/2010
CN 104732920 A 6/2015
(Continued)

OTHER PUBLICATIONS

First Office Action issued on Dec. 2, 2019 in corresponding Chinese Application No. 201811537143.0; 20 pages.
(Continued)

*Primary Examiner* — Liliana Cerullo
(74) *Attorney, Agent, or Firm* — Maier & Maier, PLLC

(57) ABSTRACT

The present application discloses a display panel, a pixel circuit and a method for driving the pixel circuit. The pixel circuit includes a drive chip, a plurality of pixel circuit units and a plurality of detection circuit units, the pixel circuit unit including a first switch tube and an electroluminescent element. A first path end of the first switch tube is connected to an anode of the electroluminescent element. A control end of the first switch tube is connected to a scan signal end. The first path end of the second switch tube is connected to the anode of the electroluminescent elements via the pixel circuit unit.

12 Claims, 4 Drawing Sheets

(56) References Cited

FOREIGN PATENT DOCUMENTS

| | | | |
|---|---|---|---|
| CN | 105247603 | A | 1/2016 |
| CN | 105448238 | A | 3/2016 |
| CN | 106157882 | A | 11/2016 |
| CN | 106409868 | A | 2/2017 |
| CN | 107039004 | A | 8/2017 |
| CN | 107978271 | A | 5/2018 |
| CN | 106504707 | B | 6/2018 |
| CN | 109545141 | A | 3/2019 |
| CN | 109616052 | A | 4/2019 |
| JP | 2009042486 | A | 2/2009 |
| KR | 20110057531 | A | 6/2011 |
| KR | 20170021406 | A | 2/2017 |

OTHER PUBLICATIONS

Second Office Action issued on Mar. 6, 2020 in corresponding Chinese Application No. 201811537143.0; 16 pages.

Rejection Decision issued on Aug. 3, 2020 in corresponding Chinese Application No. 201811537143.0; 15 pages.

International Search Report issued on Nov. 29, 2019 in corresponding International Application No. PCT/CN2019/103378; 8 pages.

* cited by examiner

DISPLAY PANEL AND PIXEL CIRCUIT WITH DETECTION AND COMPENSATION OF ANODE VOLTAGE USING THE SAME OUTPUT PIN FOR MULTIPLE PIXELS

CROSS REFERENCE

The present application is a continuation-application of International (PCT) Patent Application No. PCT/CN2019/103378, filed on Aug. 29, 2019, which claims foreign priority of Chinese Patent Application No. 201811537143.0, filed on Dec. 14, 2018, in the National Intellectual Property Administration of China, the entire contents of which are hereby incorporated by reference in its entirety.

TECHNICAL FIELD

The present disclosure relates to the field of display technologies and particularly to a display panel, a pixel circuit and a method for driving the pixel circuit.

BACKGROUND

An active-matrix organic light-emitting diode (AMOLED) display is widely used in mobile phones and TVs due to its wide viewing angle and low power consumption.

However, an efficiency of an organic light-emitting diode (OLED) declines rapidly over time, leading to a gradual decrease in a brightness of a screen, thereby affecting a display panel's display performance as well as a service life.

SUMMARY

The present disclosure may provide a display panel, a pixel circuit, and a method for driving the pixel circuit, thereby improving a display effect of the display panel and enhancing a life of the display panel.

A technical scheme according to the present disclosure is providing a pixel circuit, including a drive chip, a plurality of pixel circuit units and a plurality of detection circuit units. The plurality of pixel circuit units and the plurality of detection circuit units are coupled to the drive chip. Each detection circuit unit independently corresponds to a group of pixel circuit units arranged in a first direction and is selectively coupled to each pixel circuit unit in the group of pixel circuit units, the first direction being a row direction or a column direction of the pixel circuit units arranged in an array. Each pixel circuit unit includes a first switch tube and an electroluminescent element. A path end of the first switch tube is electrically connected to an anode of the electroluminescent element. A control end of the first switch tube is connected to a scan signal end. Each detection circuit unit includes a selection circuit, the selection circuit including a second switch tube. The first path end of the second switch tube is connected to the anode of the electroluminescent element via a corresponding pixel circuit unit. The control end of the second switch tube is connected to a first timing signal end. A second path end of the second switch tube is connected to the drive chip. When the second switch tube in the detection circuit unit is in the conduction state and the first switch tube in the pixel circuit unit coupled to the detection circuit unit is also in the conduction state, the drive chip detects a potential of the anode of the electroluminescent element in the pixel circuit unit corresponding to the first switch tube in the conduction state; at least two detection circuit units arranged adjacently in a second direction form a group; at least two adjacent the detection circuit units in the group are connected via a connection terminal, and are connected to a same pin of the drive chip via the connection terminal. The second direction differs from the first direction, being the column direction or the row direction of the pixel circuit unit arranged in an array.

Another technical scheme according to the present disclosure is to provide a method for driving a pixel circuit. The driving method includes: detecting a potential of an anode of an electroluminescent element in each pixel circuit unit, and including the potential of the anode of the electroluminescent element in a drive chip to define an anode voltage compensation signal. Each pixel circuit unit includes a first switch tube and an electroluminescent element. Each detection circuit unit includes a selection circuit, a selection circuit including a second switch tube. An operation of detecting the potential of the anode of the electroluminescent element in each pixel circuit unit includes: inputting a first timing signal to control the second switch tube in the detection circuit unit to be conducted, and inputting a scan signal to control the first switch tube in the corresponding pixel circuit unit to be conducted, thereby the drive chip being conducted with the anode of the electroluminescent element in the corresponding pixel circuit unit, and the potential of the anode of the electroluminescent element being obtained; calling, by the drive chip, the anode voltage compensation signal and outputting, by the drive chip, the anode voltage compensation signal to the corresponding pixel circuit unit. In the operation of the inputting the first timing signal to control the second switch tube in the detection circuit unit to be conducted, the second switch tubes arranged in at least two connected detection circuit units in the same group are controlled to be individually conducted, to obtain the potential of the anode of the electroluminescent element in the corresponding pixel circuit unit at different time periods.

A further technical scheme according to the present disclosure is to provide a display panel including a substrate and a pixel circuit arranged on the substrate. The pixel circuit is the pixel circuit including: a drive chip, a plurality of pixel circuit units connected and a plurality of detection circuit units. The plurality of pixel circuit units and the plurality of detection circuit units are coupled to the drive chip. Each detection circuit unit independently corresponds to a group of pixel circuit units arranged in a first direction and selectively coupled to each pixel circuit unit in the group of pixel circuit units. The first direction is a row direction or a column direction of the pixel circuit units arranged in an array. Each pixel circuit unit includes a first switch tube and an electroluminescent element, a first path end of the first switch tube electrically connected to an anode of the electroluminescent element, a control end of the first switch tube connected to a scan signal end. Each detection circuit unit includes a selection circuit. The selection circuit includes a second switch tube, a first path end of the second switch tube connected to the anode of the electroluminescent element via a corresponding pixel circuit unit, a control end of the second switch tube connected to a first timing signal end, and the drive chip connected to a second path end of the second switch tube. When the second switch tube in the detection circuit unit is in the conduction state and the first switch tube in the pixel circuit unit coupled to the detection circuit unit is also in the conduction state, the drive chip detects a potential of the anode of the electroluminescent element in the pixel circuit unit corresponding to the first switch tube in the conduction state; at least two the adjacent arranged detection circuit units in a second direction are a group; at least two the adjacent arranged detection circuit units in the group are connected via a connection terminal, and are connected to a same pin of the drive chip via the connection terminal. The second direction differs from the first direction, being the column direction or the row direction of the pixel circuit unit arranged in an array.

The present disclosure provides a pixel circuit including a drive chip, a plurality of pixel circuit units connected to the drive chip, and a plurality of detection circuit units, conducting the drive chip and an anode of an electroluminescent element in the corresponding pixel circuit unit by means of a detection circuit unit. In such a way, the drive chip may obtain the anode potential of the electroluminescent element, and achieve a compensation of the anode potential in the subsequent display stage. The circuit may be better fused with the pixel circuit unit. The circuit structure is simple, and an independent design of the stage detect and the display stage is thereby easy to be achieved, such that the detection stage may not have an effect on the display stage. A group of detection circuit units are connected to each other via a connection terminal, and correspondingly connected to a same pin to the drive chip via the connection terminal, saving the pins on the drive chip and further saving hardware resources.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

Referring to the accompanying drawings in the embodiments of the present disclosure, the technical scheme in the embodiments of the present disclosure will be described clearly and completely. It is clear that the embodiments described are only some of the embodiments of the present disclosure but not to limit the scope of the present disclosure. Any equivalent structural or process transformation performed based on the drawings and the specification of the present disclosure, applied directly and indirectly in other related art, should be within the scope of the present disclosure.

Figure 1:
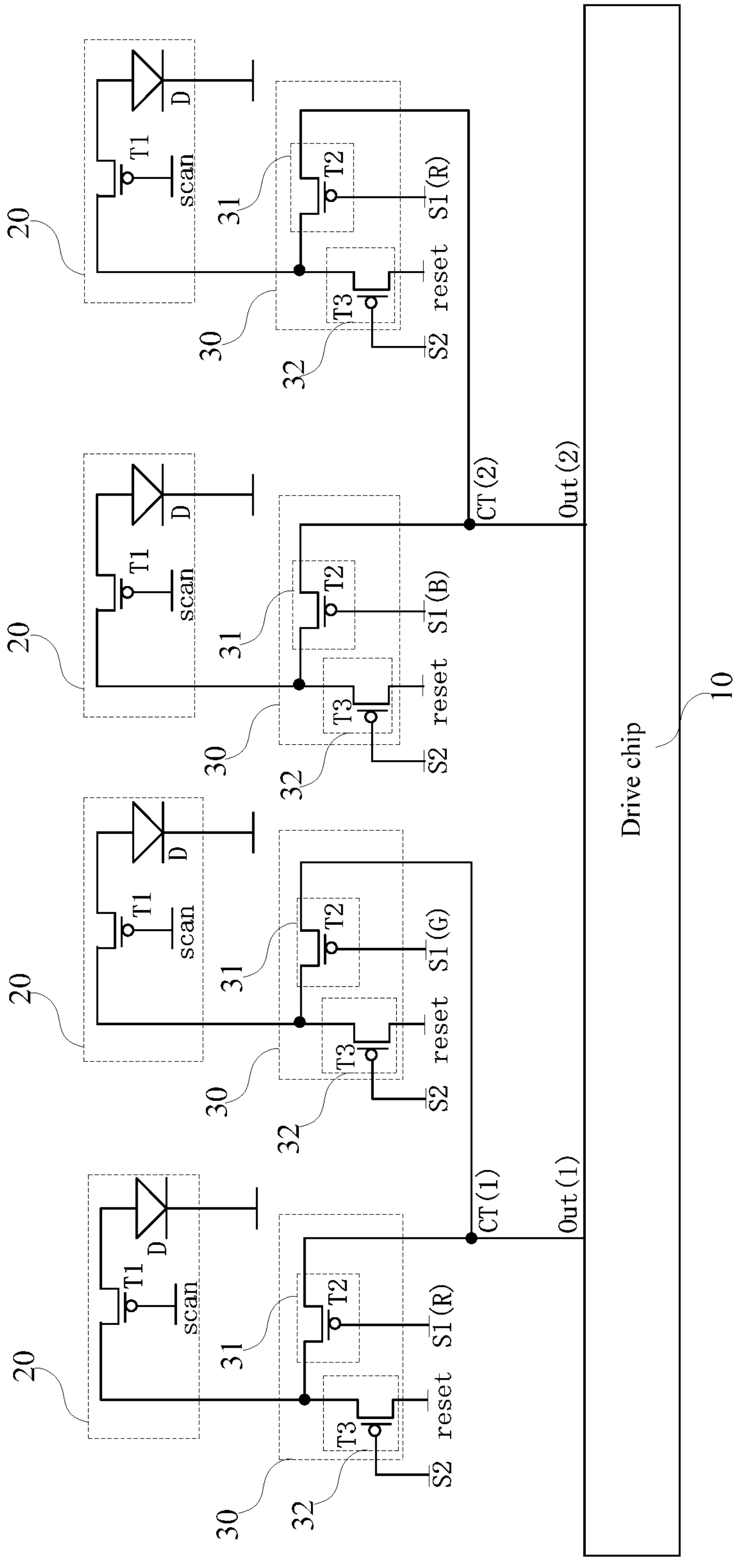
FIG. 1 is a schematic view of a circuit structure of a pixel circuit according to an embodiment of the present disclosure.

Referring to FIG. 1, FIG. 1 is a schematic view of a circuit structure of a pixel circuit according to an embodiment of the present disclosure.

In the embodiment, the pixel circuit includes a drive chip 10 and a plurality of pixel circuit units 20 and a plurality of detection circuit units 30. The plurality of pixel circuit units 20 and the plurality of detection circuit units 30 are connected to the drive chip 10.

Each detection circuit unit 30 independently corresponds to a group of pixel circuit units 20 arranged along a first direction and is selectively coupled to each pixel circuit unit 20 of the group of pixel circuit units 20. The first direction is a row direction or a column direction of the pixel circuit units 20 arranged in an array.

The first direction may be the column direction of the pixel circuit units arranged in an array. For illustrative purposes only, FIG. 1 illustrates the connection relationship between the detection circuit unit 30 and one pixel circuit unit 20 of the plurality of pixel circuit units of a column Other pixel circuit units 20 of the column have the same connection relationship with the detection circuit unit 30, which is not illustrated in turn.

In a second direction, at least two adjacent arranged detection circuit units 30 are connected to each other via a connection terminal (CT), and are connected to a same pin (Out) of the drive chip 10 via the connection terminal (CT). The second direction differs from the first direction, being the column direction or the row direction of the pixel circuit units 20 arranged in an array. As illustrated in FIG. 1, the two adjacent detection circuit units 30 are in a group and are connected to each other via the connection terminal (CT); In another embodiment, an amount of the detection circuit units 30 arranged in a group is not limited to two but may be three, four, or even more. As illustrated in FIG. 1, the second direction is the row direction of the pixel circuit units 20 arranged in an array.

Each pixel circuit unit 20 includes a first switch tube T1 and an electroluminescent element D, a path end of the first switch tube T1 electrically connected to an anode of the electroluminescent element D, and a control end of the first switch tube T1 connected to a scan signal end (scan).

Each detection circuit unit 30 includes a selection circuit 31. The selection circuit 31 includes a second switch tube T2, wherein a first path end of the second switch tube T2 is connected via a corresponding pixel circuit unit 20 to the anode of the electroluminescent element D in the corresponding pixel circuit unit 20; the control end of the second switch tube T2 is connected to a first timing signal end (S1); and a second path end of the second switch tube T2 is connected (as a connection terminal (CT)) to (the corresponding pin (Out) of) the drive chip 10. The corresponding pixel circuit unit is a pixel circuit unit in a conduction state with the detection circuit unit 30.

When the second switch tube T2 in the detection circuit unit 30 is in the conduction state and the first switch tube T1 in the pixel circuit unit 20 coupled to the detection circuit unit 30 is also in the conduction state, the drive chip 10 detects the potential of the anode of the electroluminescent element D in the pixel circuit unit 20 corresponding to the first switch tube T1 in the conduction state.

Alternatively, the first switch tubes T1 in each pixel circuit unit 20 arranged along the second direction are connected to the same scan signal end, that is, share the same scan signal (scan). Alternatively, each detection circuit unit 30 further includes a reset circuit 32, the reset circuit 32 including a third switch tube T3. The first path end of the third switch tube T3 is connected to the anode of the electroluminescent element D in the corresponding pixel circuit unit 20. The control end of the third switch tube T3 is connected to the second timing signal S2. The second path end of the third switch tube T3 is connected to the reset signal end (reset).

Figure 2:
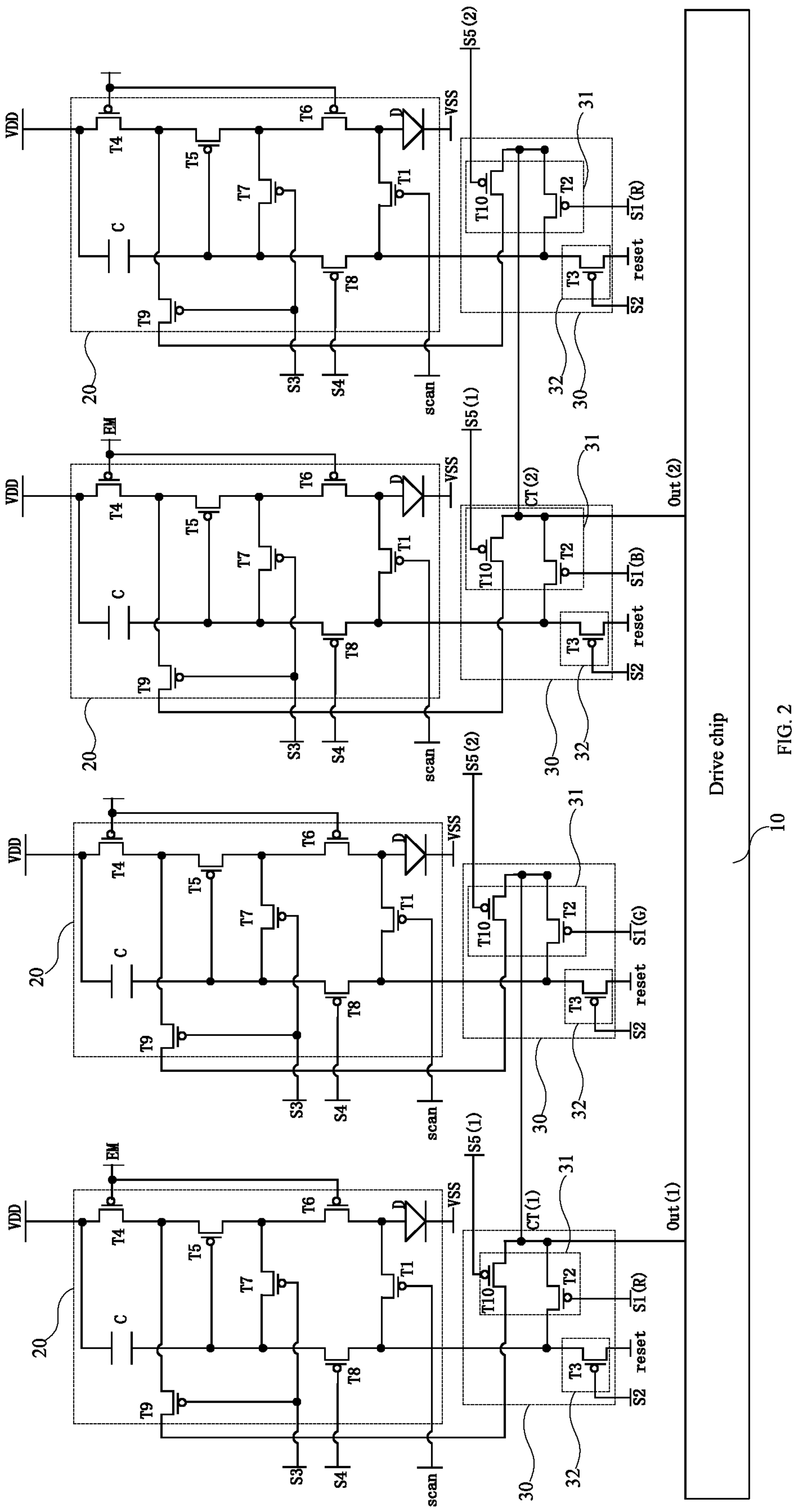
FIG. 2 is a schematic view of the circuit structure of the pixel circuit according to another embodiment of the present disclosure.

Referring to FIG. 2, FIG. 2 is a schematic view of the circuit structure of the pixel circuit according to another embodiment of the present disclosure.

In the embodiment, each pixel circuit unit 20 further includes a storage capacitor C and a current control drive tube (T5) coupled to the anode of the electroluminescent element D. The storage capacitor C is selectively coupled to the drive chip 10 and selectively coupled to the control end of the current control drive tube (T5) for receiving and storing an anode voltage compensation signal from the drive chip 10 and controlling the current control drive tube (T5) based on the anode voltage compensation signal.

The first path end of the third switch tube T3 in each detection circuit unit 30 is selectively connected to the storage capacitor C for selectively resetting the storage capacitor C. A storage accuracy of the anode voltage compensation signal may be improved by resetting the storage capacitor C.

Alternatively, the selection circuit 31 of each detection circuit unit 30 further includes a tenth switch tube T10. The first path end of the tenth switch tube T10 is coupled to an end of the storage capacitor C. The second path end of the tenth switch tube T10 is coupled to the connection terminal (CT) and the drive chip 10. The control end of the tenth switch tube T10 is coupled to the fifth timing signal end (S5).

Alternatively, the pixel circuit unit 20 further includes a fourth switch tube T4, a fifth drive tube T5, a sixth switch tube T6, a seventh switch tube T7, an eighth switch tube T8, and a ninth switch tube T9. The fifth drive tube T5 is a current control drive tube.

The first path end of the fourth switch tube T4 is connected to a first operating voltage VDD and the first end of the storage capacitor C. The first end of the storage capacitor C is also connected to the first operating voltage end (VDD). The second path end of the fourth switch tube T4 is connected to the first path end of the fifth drive tube T5 and the second path end of the ninth switch tube T9. The first path end of the fifth drive tube T5 is also connected to the second path end of the ninth switch tube T9. The control end of the fourth switch tube T4 connects an enable signal end (EM).

The second path end of the fifth drive tube T5 is connected to the first path end of the sixth switch tube T6 and the second path end of the seventh switch tube T7. The first path end of the sixth switch tube T6 is also connected to the second path end of the seventh switch tube T7. The control end of the fifth drive tube T5 is connected to the second end of storage capacitor C.

The second path end of the sixth switch tube T6 is connected to the second path end of the first switch tube T1 and the anode of the electroluminescent element D. The control end of the sixth switch tube T6 is connected to the enable signal end (EM).

The first path end of the seventh switch tube T7 is connected to the control end of the fifth drive tube T5 and the second end of the storage capacitor C, and the control end of the seventh switch tube T7 is connected to the third timing signal end (S3).

The first path end of the eighth switch tube T8 is connected to the second end of the storage capacitor C. The second path end of the eighth switch tube T8 is connected to the first path end of the first switch tube T1, the first path end of the second switch tube T2 and the first path end of the third switch tube T3. The control end of the eighth switch tube T8 is connected to the fourth timing signal end (S4).

The second path end of the ninth switch tube T9 is connected to the first path end of the fifth drive tube T5. The first path end of the ninth switch tube T9 is connected to the first path end of the tenth switch tube T10. The second path end of the tenth switch tube T10 is connected to the connection terminal (CT) and to (the corresponding pin (Out) of) the drive chip 10. The control end of the ninth switch tube T9 is connected to the third timing signal end (S3). The control end of the tenth switch tube T10 is connected to the fifth timing signal end (S5).

The first end of the storage capacitor C is connected to the first operating voltage end (VDD). The cathode of the electroluminescent element D is connected to a second operating voltage end (VSS). The first path end of the second switch tube T2 is connected to the first path end of the first switch tube T1 and the second path end of the eighth switch tube T8. The first path end of the third switch tube T3 is connected to the first path end of the first switch tube T1 and the second path end of the eighth switch tube T8.

Alternatively, the first switch tubes T1 in each pixel circuit unit 20 arranged along the second direction share the same scan signal end (scan). The first switch tube T1 in each pixel circuit unit 20 arranged along the first direction is independently connected to the corresponding scan signal end (scan). A progressive scan of each pixel circuit unit 20 in the pixel circuit is performed along the first direction during a detection phase and a display phase.

Alternatively, corresponding to each pixel circuit unit 20 arranged along the second direction, the third switch tubes T3 in the detection circuit unit 30 share the same second timing signal (S2) and the same reset signal (reset).

Alternatively, corresponding to each pixel circuit unit 20 arranged in the second direction, the control end of the second switch tube T2 in the detection circuit unit 30 is connected to a different first timing signal S1(R), S1(G), or S1(B) according to a light-emitting color of the electroluminescent element D in the corresponding pixel circuit unit 20.

Alternatively, corresponding to each group of two adjacent pixel circuit units 20 arranged along the second direction, the second path end of the second switch tube T2 in the detection circuit unit 30 is connected to the same input-output pin (Out) of the drive chip 10 correspondingly.

As illustrated in FIG. 1, the first direction is the column direction and the second direction is the row direction. The first switch tube T1 in each pixel circuit unit 20 arranged in the same row shares the same scan signal (scan). The first switch tube T1 in each pixel circuit unit 20 in the same column is independently connected to the corresponding scan signal, that is, receives the scan signal not simultaneously. In the detection stage and the display stage, a row-by-row scan of each pixel circuit unit 20 in the pixel circuit is performed along the column direction. The third switch tube T3 of the detection circuit unit 30 corresponding to each pixel circuit unit 20 of the same row shares the same second timing signal (S2) and the same reset signal (reset). The control end of the second switch tube T2 of the detection circuit unit 30 corresponding to each pixel circuit unit 20 of the same row is connected to a different first timing signal S1(R), S1(G), or S1(B) according to the light-emitting color of the electroluminescent element D of the corresponding pixel circuit unit 20. The second path end of the second switch tube T2 of the detection circuit unit 30 corresponding to each group of two adjacent pixel circuit units 20 of the same row is correspondingly connected to the same input-output pin (Out) of the drive chip 10. For example, as illustrated in FIG. 1, the first two adjacent pixel circuit units 20 of four pixel circuit units 20 in the row direction from left to right have the connection terminals CT (1) connected to the same input-output pin Out (1) and the second two adjacent pixel circuit units 20 of the four pixel circuit units 20 have the connection terminals CT (2) connected to the same input-output pin Out (2).

Specifically, each pixel circuit unit 20 corresponds to a sub-pixel unit of the display panel. Referring to FIG. 2, the three sub-pixel units from left to right are a red sub-pixel unit (R), a green sub-pixel unit (G), and a blue sub-pixel unit (B), respectively. Adjacent sub-pixel units of red, green, and blue colors (RGB) form a pixel unit. The sub-pixel units of red, green, and blue colors (RGB) are mixed to achieve different display colors of the pixel unit by controlling a different gray level of the sub-pixel units.

Sub-pixel units of different colors arranged in the same row share one scan signal (scan) (that is, share a same scan line), the same reset signal (reset), and the same second timing signal S2. The connection terminals (CT) of each group of adjacent sub-pixel units are correspondingly connected to the same input-output pin (Out) of the drive chip 10. The control end of the second switch tube T2 of the sub-pixel unit of different colors is correspondingly connected to a different first timing signal S1(R), S1(G) or S1(B).

Figure 3:
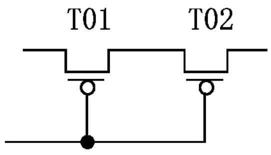
FIG. 3 is a schematic view of a double-gate switch tube structure according to an embodiment of the present disclosure.

Referring to FIG. 3, FIG. 3 is a schematic view of a double-gate switch tube structure according to an embodiment of the present disclosure. Alternatively, the seventh switch tube T7 and the eighth switch tube T8 have both a double-gate switch tube structure, the double-gate switch tube structure including a first sub-switch tube T01 and a second sub-switch tube T02. A gate of the first sub-switch tube T01 and a gate of the second sub-switch tube T02 are connected to each other as the control end of the double-gate switch tube structure. A first path end of the first sub-switch tube T01 is a first path end of the double-gate switch tube structure. A second path end of the second sub-switch tube T02 is a second path end of the double-gate switch tube structure. A second path end of the first sub-switch tube T01 is connected to a first path end of the second sub-switch tube T02.

In the above way, a leakage current of the seventh switch tube T7 and the eighth switch tube T8 may be reduced, a power loss may be reduced, and a display effect of the electroluminescent element D may be improved. In another embodiment, a metal oxide semiconductor (MOS) tube with a single gate may be configured for the seventh switch tube T7 and the eighth switch tube T8, which is not limited in the present disclosure.

Alternatively, the first switch tube T1, the second switch tube T2, the third switch tube T3, the fourth switch tube T4, the fifth drive tube T5, the sixth switch tube T6, the seventh switch tube T7, the eighth switch tube T8, the ninth switch tube T9, and the tenth switch tube T10 may be the MOS tube, specifically may be a thin-film transistor. When the control end is connected to a low potential, the first path end and the second path end are conducted. When the control end is connected to a high potential, the first path end and the second path end are cut off. In another embodiment, an opposite configuration may be performed. When the control end is connected to a low potential, the first path end and the second path end are cut off. When the control end is connected to a high potential, the first path end and the second path end are conducted. For example, a P-type MOS tube is conducted when the control end is connected to a low-potential signal, and is cut off when the control end is connected to a high-potential signal; an N-type MOS tube is conducted when the control end is connected to a high-potential signal, and is cut off when the control end is connected to a low-potential signal.

Alternatively, the first switch tube T1, the second switch tube T2, the third switch tube T3, the fourth switch tube T4, the fifth drive tube T5, the sixth switch tube T6, the seventh switch tube T7, the eighth switch tube T8, the ninth switch tube T9 and the tenth switch tube T10 each have one of the first path end and the second path end as a source, the other as a drain, and each have the control terminal as a gate.

Alternatively, the electroluminescent element D may be a luminescent element of an organic light-emitting diode (OLED), specifically an active matrix organic light-emitting diode (AMOLED). In another embodiment, other luminescent element may also be configured as the electroluminescent element D, which is not limited in the present disclosure.

Figure 4:
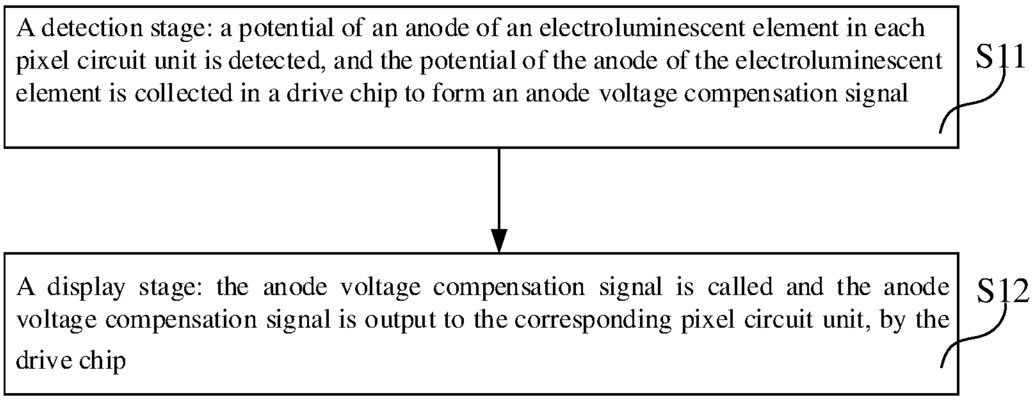
FIG. 4 is a flow chart of a method for driving the pixel circuit according to an embodiment of the present disclosure.

Referring to FIG. 4, FIG. 4 is a flow chart of a method for driving the pixel circuit according to an embodiment of the present disclosure.

In the embodiment, the pixel circuit drive method may include operations at blocks illustrated in FIG. 4.

At block S11: A detection stage: a potential of an anode of an electroluminescent element in each pixel circuit unit is detected, and the potential of the anode of the electroluminescent element is collected in a drive chip to form an anode voltage compensation signal.

Each pixel circuit unit 20 includes a first switch tube T1 and an electroluminescent element D. Each detection circuit unit 30 includes a selection circuit 31, wherein the selection circuit 31 includes a second switch tube T2. The operation of detecting the potential of the anode of the electroluminescent element D in each pixel circuit unit 20 may specifically include: inputting a first timing signal S1 to control a first path end and a second path end of the second switch tube T2 in the detection circuit unit 30 to be conducted; inputting a scan signal to control the first path end and the second path end of the first switch tube T1 to be conducted. In such a way, the drive chip 10 may be conducted with the anode of the electroluminescent element D in the corresponding pixel circuit unit 20, and the potential of the anode of the electroluminescent element D may be further obtained.

In the operation of the inputting the first timing signal S1 to control the first path end and the second path end of the second switch tube T2 in the detection circuit unit 30 to be conducted, the second switch tubes T2 in at least two adjacent detection circuit units 30 arranged in the same group (of the detection circuit units) are controlled to be individually conducted, such that the potential of the anode of the corresponding electroluminescent element D in the pixel circuit unit 30 may be obtained at different time periods, respectively.

For example, as illustrated in FIG. 1, a group of detection circuit units includes two detection circuit units 30. In the operation of the inputting the first timing signal S1 to control the first path end and the second path end of the second switch tube T2 in the detection circuit unit 30 to be conducted, the second switch tube T2 of one of the two adjacent pixel circuit units 20 along the second direction is controlled to be conducted in a first time period. The second switch tube T2 of another detection circuit unit 30 is controlled to be cut off in the first time period. In a second time period different from the first time period, the second switch tube T2 of the one of the detection circuit units 30 is controlled to be cut off and the second switch tube T2 of the another detection circuit units 30 is controlled to be conducted. In such a way, the potential of the anode of the corresponding electroluminescent element D may be obtained in the first time period and the second time period respectively. That is, the potential of the anode of the electroluminescent element D in the corresponding two groups of the pixel circuit units 20 (that is, corresponding to the two adjacent detection circuit units 30) adjacent arranged along the first direction (that is, the column direction in FIG. 1) is obtained in the first time period and the second time period, respectively.

For example, with respect to the situation of the first direction being a column direction, the electroluminescent elements D of the adjacent two columns of the pixel circuit unit 20 are obtained in the first time period and the second time period, respectively. The first switch tube T1 is controlled by a scan signal (scan), such that the potential of the anode of the electroluminescent element D in each corresponding pixel circuit unit 20 of the pixel circuit units 20 arranged in the same column is further obtained not simultaneously in the respective time period (the first time period and the second time period).

Alternatively, in the detection phase, the potential of the first timing signal S1 and the potential of the second timing signal S2 may be required only to be capable of enabling the electroluminescent element D to emit light. However, in order to reduce an effect of the detection phase on the electroluminescent element D, the potential of the first timing signal (S1) and the potential of the second timing signal (S2) may be as small as possible.

The first timing signal (S1) configured in each detection stage is kept the same, and there may be no other restriction on the first timing signal (S1) in the present disclosure beyond that. The second timing signal (S2) configured in each detection stage is kept the same. The anode voltage compensation signal is defined by the potential difference of the anode of the electroluminescent element D in each detection.

At block S12: A display stage: the anode voltage compensation signal is called and the anode voltage compensation signal is output to the corresponding pixel circuit unit, by the drive chip.

Each detection circuit unit 30 in the present disclosure further includes a reset circuit 32, the reset circuit 32 including a third switch tube T3. Alternatively, the operation of detecting the potential of the anode of the electroluminescent element D in each pixel circuit unit 20 further includes initializing the potential of the anode of the electroluminescent element D in the pixel circuit unit 20 prior to obtaining the potential of the anode of the corresponding electroluminescent element D in the pixel circuit unit 20.

The operation of the initializing the potential of the anode of the electroluminescent element D includes: inputting a second timing signal (S2) to control the first path end and the second path end of the third switch tube T3 to be conducted; inputting a scan signal (scan) to control the first path end and the second path end of the first switch tube T1 to be conducted. In such a way, the reset signal end (reset) may be conducted with the anode of the electroluminescent element D in the corresponding pixel circuit unit 20, and thus the potential of the anode of the electroluminescent element D may be initialized.

Alternatively, in an operation of detecting the potential of the anode of the electroluminescent element D in a group of the pixel circuit units 20 corresponding to the detection circuit unit 30 (including the operation of initializing the anode), the second timing signal (S2) is input, such that the first path end and the second path end of the third switch tube T3 may be controlled to be continuously conducted, the electroluminescent element D may continuously emit light, and the effect of the detection phase on the electroluminescent element D may be reduced.

Figure 5:
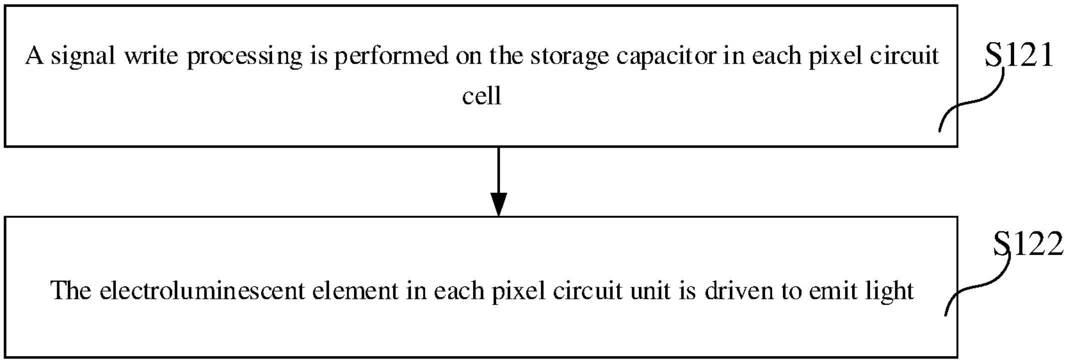
FIG. 5 is a flow chart of a display stage of a method for driving the pixel circuit according to an embodiment of the present disclosure.

Referring to FIG. 5, FIG. 5 is a flow chart of a display stage of a method for driving the pixel circuit according to an embodiment of the present disclosure. Each pixel circuit unit 20 further includes a storage capacitor C and a current control drive tube (T5) coupled to the anode of the electroluminescent element D. The selection circuit of each detection circuit unit further includes a tenth switch tube.

Alternatively, the display stage may specifically include operations at blocks illustrated in FIG. 5.

At block S121: a signal write processing is performed on the storage capacitor C in each pixel circuit cell 20.

The operation of the signal writing processing to the storage capacitor C in each pixel circuit unit 20 includes: controlling the tenth switch tube T10 in the detection circuit unit 30 to be in a conduction state, and controlling a circuit between the tenth switch tube T10 and the storage capacitor C in the corresponding pixel circuit unit 20 to be in a conduction state. In such a way, the drive chip 10 may be electrically connected to the storage capacitor C in the corresponding pixel circuit unit 20, and the anode voltage compensation signal in the drive chip 10 may be output to the storage capacitor C in the corresponding pixel circuit unit 20.

Alternatively, the operation of the signal writing processing to the storage capacitor C in each pixel circuit unit 20 includes an operation of initializing the storage capacitor C in the corresponding pixel circuit unit 20 in advance (prior to the signal writing processing). The operation of the initializing the storage capacitor C in the corresponding pixel circuit unit 20 includes controlling the third switch tube T3 in the detection circuit unit 30 to be in a conduction state, and controlling the circuit between the third switch tube T3 and the storage capacitor C in the corresponding pixel circuit unit 20 to be in a conduction state, such that the reset signal end (reset) may be conducted with the storage capacitor C in the corresponding pixel circuit unit 20 and the storage capacitor C may be initialized.

In the operation of the controlling the circuit between the tenth switch tube T10 and the storage capacitor C in the corresponding pixel circuit unit 20 to be in a conduction state, the second switch tube T2 in the corresponding detection circuit unit 30 is controlled to be in a cut-off state, and the tenth switch tubes T10 arranged in at least two adjacent detection circuit units 30 in the same group are individually conducted, respectively. In such a way, the anode voltage compensation signal in the drive chip 10 is output to the storage capacitor C in the corresponding pixel circuit unit 20 at different time periods.

Specifically, as illustrated in FIG. 2, a group of detection circuit units 30 includes two adjacent arranged detection circuit units 30. In the operation of the controlling the circuit between the tenth switch tube T10 and the storage capacitor C in the corresponding pixel circuit unit 20 to be in a conduction state, in the third time period, the tenth switch tube T10 of one of the two adjacent detection circuit units 30 is controlled to be in a conduction state, and the tenth switch tube T10 of another detection circuit unit 20 is controlled to be in a cut-off state; in a fourth time period different from the third time period, the tenth switch tube T10 of the one of the detection circuit units 30 is controlled to be in a cut-off state and the tenth switch tube T10 of the another detection circuit unit 30 is controlled to be in a conduction state. In such a way, the operation of outputting the anode voltage compensation signal from the drive chip 10 to the storage capacitor C in the corresponding pixel circuit unit 20 is independently performed in the third time period and the fourth time period respectively.

The control end of the tenth switch tube T10 of one of the detection circuit units 30 and the control end of the tenth switch tube T10 of the another detection circuit unit 30 are connected to different fifth timing signals (S5). As illustrated in FIG. 2, the control end of the tenth switch tube T10 of the one of the detection circuit units 30 is connected to the fifth timing signal S5(1) and the control end of the tenth switch tube T10 of the another detection circuit unit 30 is connected to the fifth timing signal S5(2).

Alternatively, the control end of the tenth switch tube T10 of a former detection circuit unit 30 (the one of the detection circuit units 30) of each group of detection circuit units is connected to the same fifth timing signal S5(1) and the control end of the tenth switch tube T10 of the latter detection circuit unit 30 (the another of the detection circuit units 30) is connected to the same fifth timing signal S5(2).

The tenth switch tube T10 in the corresponding detection circuit unit 30 may be controlled to be conducted or cut off by inputting the fifth timing signal S5.

At block S122: the electroluminescent element D in each pixel circuit unit 20 is driven to emit light.

The operation of driving the electroluminescent element D in each pixel circuit unit 20 to emit light includes releasing the current in the storage capacitor C, such that the current control drive tube (T5) corresponding to the storage capacitor C is controlled to be in a conduction state, thereby causing the corresponding electroluminescent element D to emit light.

Alternatively, the operation of the driving the electroluminescent element D in each pixel circuit unit 20 to emit light further includes an operation of resetting the anode of the corresponding electroluminescent element D in the pixel circuit unit 20 in advance (before the electroluminescent element D emitting light). The operation of the resetting the anode of the corresponding electroluminescent element D in the pixel circuit unit 20 includes: controlling the third switch tube T3 in the detection circuit unit 30 to be in a conduction state, and controlling the first switch tube T1 in the corresponding pixel circuit unit 20 to be in a conduction state, such that the reset signal end (reset) is conducted with the anode of the corresponding electroluminescent element D in the pixel circuit unit 20, thereby resetting the anode potential of the corresponding electroluminescent element D.

Alternatively, the reset signal configured in the detection stage is different from the reset signal configured in the display stage. Specifically, in the detection stage, a potential of the reset signal (reset) is higher than a second operating voltage VSS, and a voltage difference between the reset signal (reset) and the second operating voltage VSS is greater than a turn-on voltage of the electroluminescent element D. In the display stage, the potential of the reset signal (reset) is less than or equal to the potential of the second operating voltage VSS. In such a way, the electroluminescent element D may emit light during the detection phase, reducing the effect of the detection process on the electroluminescent element D.

As illustrated in FIG. 2, each pixel circuit unit 20 further includes a fourth switch tube T4, a fifth drive tube T5, a sixth switch tube T6, a seventh switch tube T7, an eighth switch tube T8 and a ninth switch tube T9.

Specifically, in the operation of the signal write processing on the storage capacitor C in each pixel circuit cell 20, the operation of the initializing the storage capacitor C in the corresponding pixel circuit unit 20 includes: controlling an enable signal EM to control the first path end and the second path end of the fourth switch tube T4 to be cut off, and to control the first path end and the second path end of the sixth switch tube T6 to be cut off; controlling the scan signal (scan) to control the first path end and the second path end of the first switch tube T1 to be cut off; controlling the third timing signal (S3) to control the first path end and the second path end of the seventh switch tube T7 to be cut off, and to control the first path end and the second path end of the ninth switch tube T9 to be cut off; inputting the second timing signal (S2) to control the first path end and the second path end of the third switch tube T3 to be conducted; inputting the fourth timing signal (S4) to control the first path end and the second path end of the eighth switch tube T8 to be conducted, and the storage capacitor C to be reset by the reset signal (reset).

The operation of the outputting the anode voltage compensation signal from the drive chip 10 to the storage capacitor in the corresponding pixel circuit unit includes: controlling the enable signal EM to control the first path end and the second path end of the fourth switch tube T4 to be cut off, and to control the first path end and the second path end of the sixth switch tube T6 to be cut off; controlling the scan signal (scan) to control the first path end and the second path end of the first switch tube T1 to be cut off; controlling the fourth timing signal (S4) to control the first path end and the second path end of the first switch tube T8 to be cut off; inputting the third timing signal (S3) to control the first path end and the second path end of the third switch tube T7 to be conducted, and to control the first path end and the second path end of the third switch tube T9 to be conducted; inputting the fifth timing signal (S5) to control the first path end and the second path end of the third switch tube T10 to be conducted, and the anode voltage compensation signal to be written to the storage capacitor C by the drive chip 10.

In the operations described above, the fifth drive tube T5 may also be in a conduction state, which is because the storage capacitor C may retain a certain amount of current after the initialization process is completed, and the current may be input into the control end of the fifth drive tube T5, such that the first path end and the second path end of the fifth drive tube T5 is controlled to be conducted. At the same time, the ninth switch tube T9, the fifth drive tube T5 and the seventh switch tube T7 are in a conduction state. The drive chip 10 may write the anode voltage compensation signal to the storage capacitor C, and some of the output current from the first path end of the seventh switch tube T7 may flow into the control end of the fifth drive tube T5, such that the first path end and the second path end of the fifth drive tube T5 is controlled to be in a conduction state.

Specifically, in the operation of the driving the electroluminescent element D in each pixel circuit unit 20 to emit light, the operation of the resetting the anode of the electroluminescent element D in the corresponding pixel circuit unit 20 includes: controlling the enable signal EM to control the first path end and the second path end of the fourth switch tube T4 to be cut off, and to control the first path end and the second path end of the sixth switch tube T6 to be cut off; controlling the third timing signal (S3) to control the first path end and the second path end of the seventh switch tube T7 to be cut off, and to control the first path end and the second path end of the ninth switch tube T9 to be cut off; controlling the fourth timing signal (S4) to control the first path end and the second path end of the eighth switch tube T8 to be cut off; inputting the scan signal (scan) to control the first path end and the second path end of the first switch tube T1 to be conducted; inputting the second timing signal (S2) to control the first path end and the second path end of the third switch tube T3 to be conducted, and the storage capacitor C to be reset by the reset signal (reset).

The operation of causing the corresponding electroluminescent element D in a light-emitting state includes: controlling the scan signal (scan) to control the first path end and the second path end of the first switch tube T1 to be cut off; controlling the third timing signal (S3) to control the first path end and the second path end of the seventh switch tube T7 to be cut off, and to control the first path end and the second path end of the ninth switch tube T9 to be cut off; controlling the fourth timing signal (S4) to control the first path end and the second path end of the eighth switch tube T8 to be cut off; inputting the enable signal EM to control the first path end and the second path end of the fourth switch tube T4 to be conducted, and to control the first path end and the second path end of the sixth switch tube T6 to be conducted, and the electroluminescent element D to emit light.

The driving method according to the present disclosure is a continuous process. Specifically, the scan signal (scan) is controlled to perform a row-by-row (along the second direction) scan of each pixel circuit unit 20 arranged along the first direction, and a synchronous scan of each pixel circuit unit 20 arranged in the same row (along the second direction) and connected to the detection circuit units 30 arranged in a different group. In such a way, the storage capacitor C may be initialized, a signal may be written to the storage capacitor C, the anode potential of the electroluminescent element D may be reset, and the electroluminescent element D may emit light. The scan signal (scan) is controlled to perform a sequent scan of each pixel circuit unit 20 arranged in the same row (along the second direction) and connected to the detection circuit units 30 arranged in the same group. In such a way, the storage capacitor C may be initialized, a signal may be written to the storage capacitor C, the anode potential of the electroluminescent element D may be reset, and the electroluminescent element D may emit light. At the same time, the scan signal (scan) performs a sequent scan of each pixel circuit unit 20 arranged in the same column (along the first direction). In such a way, the storage capacitor C may be initialized, a signal may be written to the storage capacitor C, the anode potential of the electroluminescent element D may be reset, and the electroluminescent element D may emit light. For example, when the storage capacitor C in the pixel circuit unit 20 in the fourth column is initialized, a signal is written to the storage capacitor C in the pixel circuit unit 20 in the third column that has completed the initialization of the storage capacitor C; the anodic potential of the electroluminescent element D in the pixel circuit unit 20 in the second column in which the writing signal of the storage capacitor C is completed is reset; the electroluminescent element D in the pixel circuit unit 20 in the first column that has completed the anode potential reset of the electroluminescent element D emits light.

Figure 6:
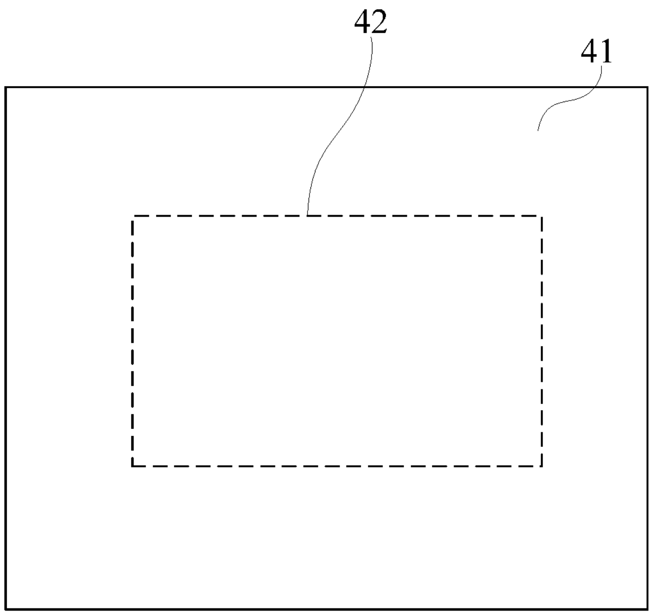
FIG. 6 is a structural schematic view of a display panel according to an embodiment of the present disclosure.

Referring to FIG. 6, FIG. 6 is a structural schematic view of a display panel according to an embodiment of the present disclosure.

In the embodiment, the display panel includes a substrate 41 and a pixel circuit 42 arranged on the substrate 41. The pixel circuit 42 may be the pixel circuit according to any of the above embodiments.

The substrate 41 may be a rigid substrate, and may be also a flexible substrate, which is not limited in the embodiments of the present disclosure.

The present disclosure provides a pixel circuit including a drive chip, a plurality of pixel circuit units and a plurality of detection circuit units. The plurality of pixel circuit units and the plurality of detection circuit units are coupled to the drive chip. A detection circuit unit is configured, such that the drive chip and an anode of an electroluminescent element in a corresponding pixel circuit are conducted. The drive chip may thus obtain the anode potential of the electroluminescent element, facilitating a subsequent display stage of the anode potential compensation. The circuit may be better fused with the pixel circuit unit. The circuit structure is simple, and an independent design of the stage detect and the display stage is thereby easy to be achieved, such that the detection stage may not have an effect on the display stage. A group of detection circuit units are connected to each other via a connection terminal, and correspondingly connected to a same pin to the drive chip via the connection terminal, saving the pins on the drive chip and further saving hardware resources.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A pixel circuit, comprising:

a drive chip;

a plurality of pixel circuit units; and a plurality of detection circuit units, wherein the plurality of pixel circuit units and the plurality of detection circuit units are coupled to the drive chip, each detection circuit unit independently corresponds to a group of the plurality of pixel circuit units arranged along a first direction and is selectively coupled to each pixel circuit unit in the group of the plurality of pixel circuit units, the first direction is a row direction or a column direction of the pixel circuit units arranged in an array, and; each pixel circuit unit comprises:

a storage capacitor selectively coupled to the drive chip, configured to receive and store an anode voltage compensation signal from the drive chip, and a first end of the storage capacitor is connected to a first operating voltage;

a first switch tube and an electroluminescent element, the first switch tube has a path end electrically connected to an anode of the electroluminescent element, and a control end connected to a scan signal end, and each detection circuit unit comprises:

a selection circuit comprising a second switch tube having:

a first path end connected to the anode of the electroluminescent element via a corresponding pixel circuit unit, a control end connected to a first timing signal end, and a second path end connected to the drive chip;

when the second switch tube in the detection circuit unit is in a conduction state and the first switch tube in the pixel circuit unit coupled to the detection circuit unit is also in the conduction state, the drive chip detects a potential of the anode of the electroluminescent element in the pixel circuit unit corresponding to the first switch tube in the conduction state; and at least two detection circuit units arranged adjacently along a second direction to form a group, wherein the at least two adjacent detection circuit units in the group are connected to each other via a connection terminal, and are connected to a same pin of the drive chip via the connection terminal, and the second direction is a column direction or a row direction of the pixel circuit units arranged in the array different from the first direction.

2. The pixel circuit according to claim 1, wherein the first switching tube in each pixel circuit unit arranged along the second direction is connected to a same scan signal end.

3. The pixel circuit according to claim 1, wherein, each detection circuit unit further comprises:

a reset circuit comprising a third switch tube having;

a first path end connected to the anode of the electroluminescent element in a corresponding pixel circuit unit via the corresponding pixel circuit unit, a control end connected to a second timing signal end, and a second path end connected to a reset signal end.

4. The pixel circuit according to claim 3, wherein, each pixel circuit unit further comprises:

a current control drive tube coupled to the anode of the electroluminescent element, the storage capacitor is selectively coupled to a control end of the current control drive tube and further configured to control the current control drive tube in accordance with the anode voltage compensation signal.

5. The pixel circuit according to claim 4, wherein the first path end of the third switch tube in each detection circuit unit is coupled to the storage capacitor in the corresponding pixel circuit and the storage capacitor is selectively reset processed.

6. The pixel circuit according to claim 4, wherein the selection circuit further comprises:

a tenth switch tube having a first path end coupled to an end of the storage capacitor, a second path end coupled to the connection terminal and the drive chip, and a control end coupled to a fifth timing signal end.

7. The pixel circuit according to claim 4, wherein each pixel circuit unit further comprises:

a fourth switch tube, a first path end of the fourth switch tube is connected to a first operating voltage terminal, a control terminal of the fourth switch tube is connected to an enable signal terminal;

a fifth drive tube, the fifth drive tube is the current control drive tube, a second path end of the fourth switch tube is connected to the first path end of the fifth drive tube, and a control end of the fifth drive tube is connected to a second end of the storage capacitor;

a sixth switch tube, a second path end of the fifth drive tube is connected to a first path end of the sixth switch tube, a second path end of the sixth switch tube is connected to the second path end of the first switch tube and the anode of the electroluminescent element; and a control end of the sixth switch tube is connected to an enable signal end;

a seventh switch tube, a second path end of the fifth drive tube is connected to a second path end of the seventh switch tube, a first path end of the seventh switch tube is connected to the control end of the fifth drive tube; and a control end of the seventh switch tube is connected to a third timing signal end;

an eighth switch tube, a first path end of the eighth switch tube is connected to the second end of the storage capacitor, a second path end of the eighth switch tube is connected to the first path end of the second switch tube and the first path end of the third switch tube, and a control end of the eighth switch tube is connected to a fourth timing signal end; and a ninth switch tube, a second path end of the fourth switch tube is connected to the second path end of the ninth switch tube, the second path end of the ninth switch tube is connected to the first path end of the fifth drive tube, and a control end of the ninth switch tube is connected to the third timing signal end; and the selection circuit in each detection circuit unit further comprises:

a tenth switch tube, a first path end of the ninth switch tube is connected to the first path end of the tenth switch tube, a second path end of the tenth switch tube is connected to the connection terminal and the drive chip, and a control end of the tenth switch tube is connected to a fifth timing signal end, the first end of the storage capacitor is connected to a first terminal of the fourth switch tube a cathode of the electroluminescent element is connected to a second working voltage, the first path end of the second switch tube is connected to the first path end of the first switch tube, and the first path end of the third switch tube is connected to the first path end of the first switch tube, and corresponding to each group of two adjacent pixel circuit units arranged along the second direction, the second path end of the second switch tube is connected to a same input-output pin of the drive chip.

8. The pixel circuit according to claim 7, wherein the seventh switch tube and the eighth switch tube have a double-gate switch tube structure comprising:

a first sub-switch tube, a first path end of the first sub-switch tube is a first path end of the double-gate switch tube structure; and a second sub-switch tube, a second path end of the second sub-switch tube is a second path end of the double-gate switch tube structure, a gate of the first sub-switch tube and a gate of the second sub-switch tube are connected as a control end of the double-gate switch tube structure, and a second path end of the first sub-switch tube and a first path end of the second sub-switch tube are connected.

9. The pixel circuit of claim 1, wherein each pixel circuit unit corresponds to a sub-pixel unit of a display panel, three sub-pixel units are a red sub-pixel unit, a green sub-pixel unit, and a blue sub-pixel unit, adjacent sub-pixel units of red, green, and blue colors form a pixel unit, sub-pixel units of red, green, and blue colors are mixed to achieve different display colors of the pixel unit by controlling a different gray level of the sub-pixel units, sub-pixel units of different colors arranged in a same row share a same reset signal and a same second timing signal, wherein connection terminals of each group of adjacent sub-pixel units are correspondingly connected to a same input-output pin of the drive chip, and a control end of the second switch tube of the sub-pixel unit of different colors is correspondingly connected to a different first timing signal.

10. A display panel, comprising:

a substrate; and a pixel circuit arranged on the substrate, the pixel circuit comprising:

a drive chip;

a plurality of pixel circuit units; and a plurality of detection circuit units, wherein the plurality of pixel circuit units and the plurality of detection circuit units are coupled to the drive chip, each detection circuit unit independently corresponds to a group of the plurality of pixel circuit units arranged along a first direction and selectively coupled to each pixel circuit unit in the group of the plurality of pixel circuit units, the first direction is a row direction or a column direction of the pixel circuit units arranged in an array, and; each pixel circuit unit comprises:

a storage capacitor selectively coupled to the drive chip, configured to receive and store an anode voltage compensation signal from the drive chip, and a first end of the storage capacitor is connected to a first operating voltage;

a first switch tube; and an electroluminescent element, wherein the first switch tube has a path end electrically connected to an anode of the electroluminescent element, and a control end connected to a scan signal end, and each detection circuit unit comprises:

a selection circuit comprising a second switch tube having:

a first path end connected to the anode of the electroluminescent element via a corresponding pixel circuit unit, a control end connected to a first timing signal end, and a second path end connected to the drive chip;

when the second switch tube in the detection circuit unit is in a conduction state and the first switch tube in the pixel circuit unit coupled to the detection circuit unit is also in the conduction state, the drive chip detects a potential of the anode of the electroluminescent element in the pixel circuit unit corresponding to the first switch tube in the conduction state; and at least two detection circuit units adjacent arranged along a second direction compose a group, wherein the at least two adjacent arranged detection circuit units in the group are connected to each other via a connection terminal, and are connected to a same pin of the drive chip via a connection terminal, and the second direction is a column direction or a row direction of the pixel circuit units arranged in the array as opposed to the first direction.

11. The display panel according to claim 10, wherein each detection circuit unit further comprises:

a reset circuit comprising a third switch tube having:

a first path end connected to the anode of the electroluminescent element in the corresponding pixel circuit unit via the corresponding pixel circuit unit, a control end connected to a second timing signal end, and a second path end connected to a reset signal end.

12. The display panel according to claim 11, wherein each pixel circuit unit further comprises:

a current control drive tube coupled to the anode of the electroluminescent element, the storage capacitor is selectively coupled to a control end of the current control drive tube, and configured to control the current control drive tube in accordance with the anode voltage compensation signal.

* * * * *